United States Patent
Remmers

(10) Patent No.: US 6,494,653 B2
(45) Date of Patent: Dec. 17, 2002

(54) WALL ANCHOR

(75) Inventor: Lee Remmers, Ocala, FL (US)

(73) Assignee: Emerson Electric Company, Ocala, FL (US)

( * ) Notice: Subject to any disclaimer, the term of this patent is extended or adjusted under 35 U.S.C. 154(b) by 0 days.

(21) Appl. No.: 09/835,967

(22) Filed: Apr. 17, 2001

(65) Prior Publication Data

US 2002/0150442 A1 Oct. 17, 2002

(51) Int. Cl.[7] .................. F16B 21/00; F16B 13/06
(52) U.S. Cl. .................. 411/344; 411/45; 411/62; 411/340
(58) Field of Search .................. 411/41, 44, 45, 411/46, 48, 62, 340, 344

(56) References Cited

U.S. PATENT DOCUMENTS

| | | | |
|---|---|---|---|
| 4,518,291 A | 5/1985 | Lang et al. | 411/60 |
| 4,548,327 A | 10/1985 | Kilkelly | 211/187 |
| 4,571,134 A | * 2/1986 | Beglinger et al. | 411/41 |
| 4,646,998 A | 3/1987 | Pate | 248/250 |
| 4,669,936 A | 6/1987 | Camilleri | 411/340 |
| 4,722,648 A | 2/1988 | Camilleri | 411/340 |
| 4,735,325 A | 4/1988 | Remmers | 211/187 |
| 4,752,170 A | 6/1988 | McSherry et al. | 411/60 |
| 4,753,405 A | 6/1988 | Camilleri | 248/235 |
| D310,623 S | 9/1990 | Aranibar | D8/380 |
| D322,555 S | 12/1991 | Kokenge et al. | D8/380 |
| 5,286,152 A | * 2/1994 | Anderson | 411/45 |
| 5,409,336 A | 4/1995 | Jericevich et al. | 411/41 |
| 5,533,851 A | 7/1996 | Remmers | 411/344 |
| 5,540,528 A | * 7/1996 | Schmidt et al. | 411/48 X |
| 5,704,746 A | * 1/1998 | Leib et al. | 411/41 X |
| 5,807,050 A | 9/1998 | Daler et al. | 411/36 |
| 6,086,035 A | 7/2000 | Trifilio | 248/305 |

FOREIGN PATENT DOCUMENTS

DE       2847595       * 5/1980       ................ 411/62

* cited by examiner

Primary Examiner—Neill Wilson

(57) ABSTRACT

The present invention is a wall anchor having a novel finger configuration. This wall anchor has a head and barrel portion with a bore extending therethrough and laterally expandable fingers in general alignment with the bore. Instead of a straight channel, a channel having curved portions separates the fingers. The curved portions of the channel define ramp surfaces that at least partially extend into the path of a securing member created by the bore. Thus, when a securing member, such as a bolt, pin, screw, nail or similar object is inserted into the bore to secure the wall anchor to the wall, the securing member contacts the two ramp surfaces, separating the fingers. As the fingers separate, a portion of the fingers near the ramp surfaces deform such that the ramp surfaces rest on an outer portion of the securing member, thus providing a securing force for connecting the wall anchor to the wall and relieving stress on the area at which the fingers are connected to the barrel.

11 Claims, 5 Drawing Sheets

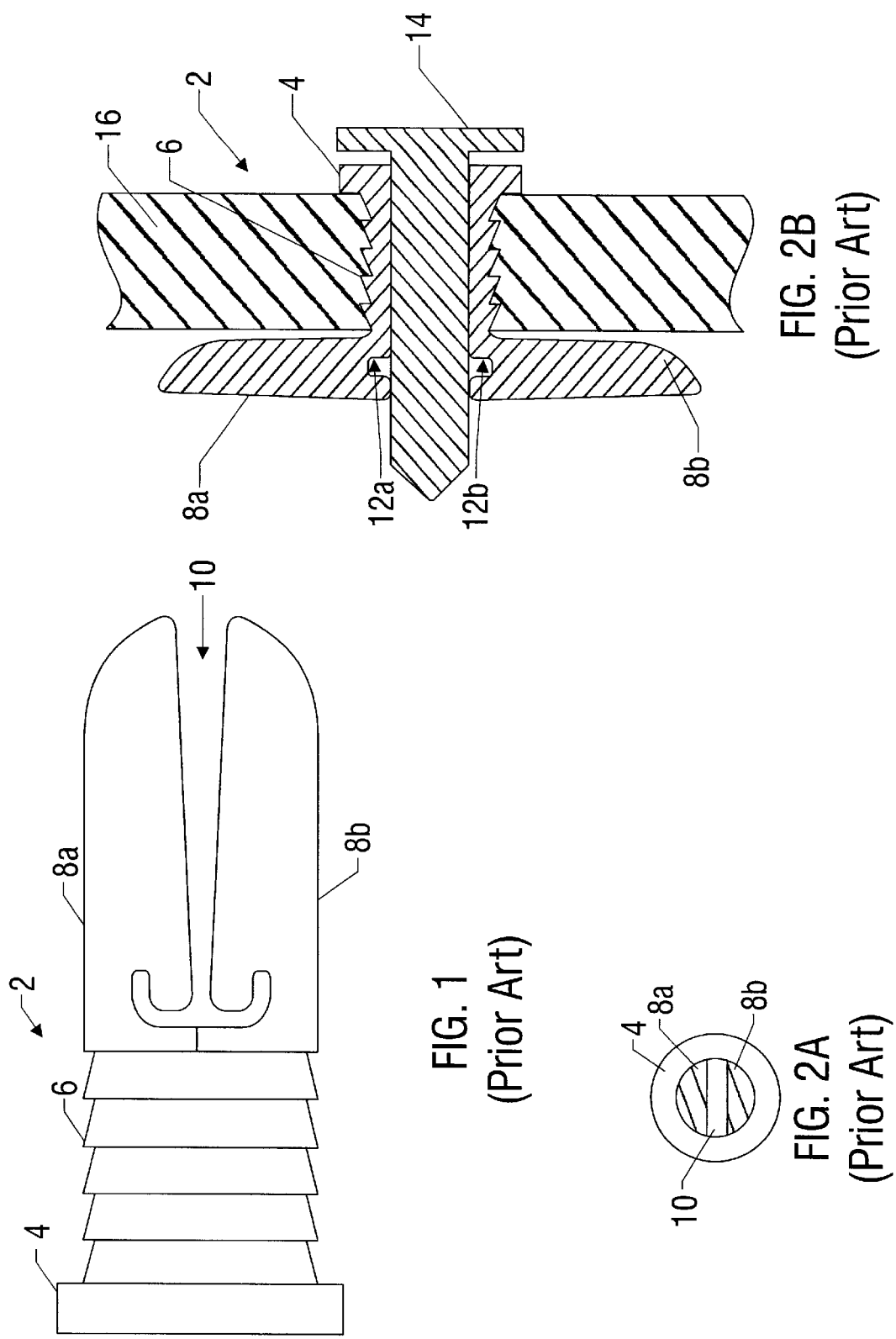

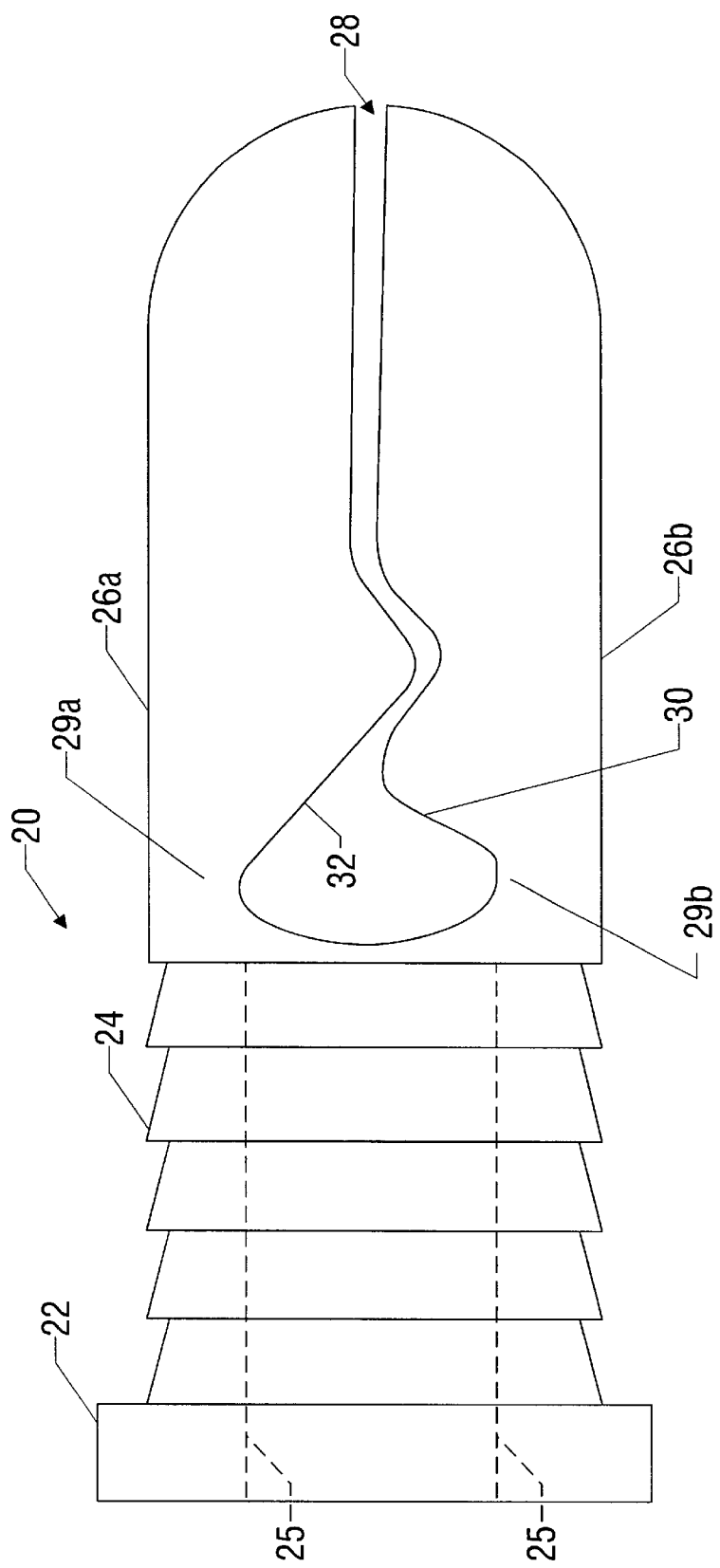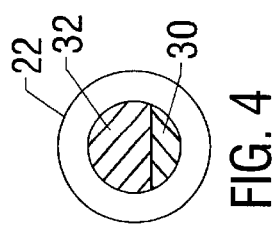

WALL ANCHOR

BACKGROUND OF THE INVENTION

In walls formed of plaster boards, sheet rock, plywood and other relatively thin or soft materials, problems can arise when attempting to mount objects to these walls, particularly transverse rods for draperies, drapes, lighting fixtures, picture frames and other objects which impose stress upon these walls. These walls can be incapable of receiving the aforementioned rods, fixtures and frames when held in place by standard screws and bolts. Thus, it has become common practice to use anchoring sockets of some sort in order to secure these objects to a wall. A number of wall anchors are noted in the prior art, particularly U.S. Pat. Nos. 4,646,998; 4,752,170; 5,409,339; 5,533,851; and 6,086,035.

Prior art wall anchors, or back clips as they are otherwise known, such as disclosed in U.S. Pat. No. 4,669,936, teach a back clip having a body portion with a hollow barrel therein and laterally expandable fingers in alignment with the hollow barrel. The fingers extend through a wall and upon receiving a bolt, pin, screw or other securing member through the barrel, the laterally expandable fingers expand against the inside portion of the wall.

Common wall anchors, such as the one taught by U.S. Pat. No. 4,669,936, have a straight channel separating the fingers. This channel is usually narrower than the hollow barrel portion, so that when the securing member is inserted, it expands the fingers, securing the wall anchor to the wall. When these fingers are expanded they necessarily bend or hinge at some point on the finger, usually at a point at or near where each finger is connected to the hollow barrel. This hinge portion of the fingers is thus normally under some amount of stress due to the deformation that takes place in the wall anchor when the bolt, pin or screw is introduced into the wall anchor. Because of this stress, harder, more rigid plastics, the most preferred material of construction for wall anchors, tend to break in this hinge area, particularly when used in cold-weather. Softer plastics are commonly used to avoid this breakage problem, but may correspondingly reduce the strength of the wall anchor.

Referring to FIG. 1, a prior art wall anchor 2 is shown. Wall anchor 2 of FIG. 1 includes a generally flat circular head 4 having a bore therethrough (not shown) for receiving a securing member, such as a bolt, pin, screw, nail or similar object (not shown). Wall anchor 2 also contains a barrel 6 having a bore therethrough (not shown) and a pair of symmetrical fingers 8a and 8b flexibly joined to the barrel 14 at its back end. A generally straight channel 10 separates the two symmetrical fingers 8a and 8b. FIG. 2A shows a view of the prior art wall anchor from the front, and, looking through the bore in head 4, channel 10 is visible between the two symmetrical fingers 8a and 8b.

FIG. 2B shows the prior art wall anchor 2 in its secured position in a wall 16. The bores through the barrel 6 and the head 4 receive a securing member, in this case a mounting pin 14, therethrough. When the mounting pin 14 is inserted into the wall anchor, the pin engages and spreads the fingers 8a and 8b apart. The portions 12a and 12b, where the fingers 8a and 8b attach to the barrel 6, are under a considerable amount of stress due to the deformation that takes place when the fingers are expanded.

It would thus be desirable to develop a wall anchor designed to reduce stress in the hinge portion of the fingers. This type of wall anchor would allow for the use of harder, more rigid plastics, resulting in a stronger anchor less susceptible to breakage.

SUMMARY OF THE INVENTION

A wall anchor has a body portion having a hollow barrel and laterally expandable fingers in general alignment with the hollow barrel. Instead of using a straight channel separating two symmetrical fingers, as is commonly used in prior art wall anchors, an asymmetrical channel is used to provide at least two ramp surfaces, one on each of a plurality of asymmetrical fingers, i.e. none of the fingers are the same shape. The ramp surfaces face the path created by the hollow portion of the barrel. Thus, when a securing member, such as a bolt, pin, screw, nail or other similar object, is inserted into the hollow barrel to secure the wall anchor to the wall, the securing member contacts the two ramp surfaces. As the securing member is pushed through the hollow barrel and into the curved channel, it separates the fingers. As the fingers separate, the ramp surfaces deform under the pressure exerted by the securing member, and then rest on an outer portion of the securing member.

This design thus allows for a redistribution of the stress from a hinge portion of the anchor to the ramp surfaces of the fingers when the fingers are separated. This allows the wall anchor to be manufactured from harder, more rigid materials, thereby improving the strength of the wall anchor and reducing its susceptibility to breaking.

BRIEF DESCRIPTION OF THE DRAWINGS

FIG. 1 is a side view of a prior art wall anchor.

FIG. 2A is a front view of a prior art wall anchor.

FIG. 2B is a side, cross-sectional view of the prior art anchor secured in a wall with its fingers expanded.

FIG. 3 is a side view of one embodiment of the present invention.

FIG. 4 is a front view of one embodiment of the present invention.

DESCRIPTION OF ILLUSTRATIVE EMBODIMENTS

Figure 5:
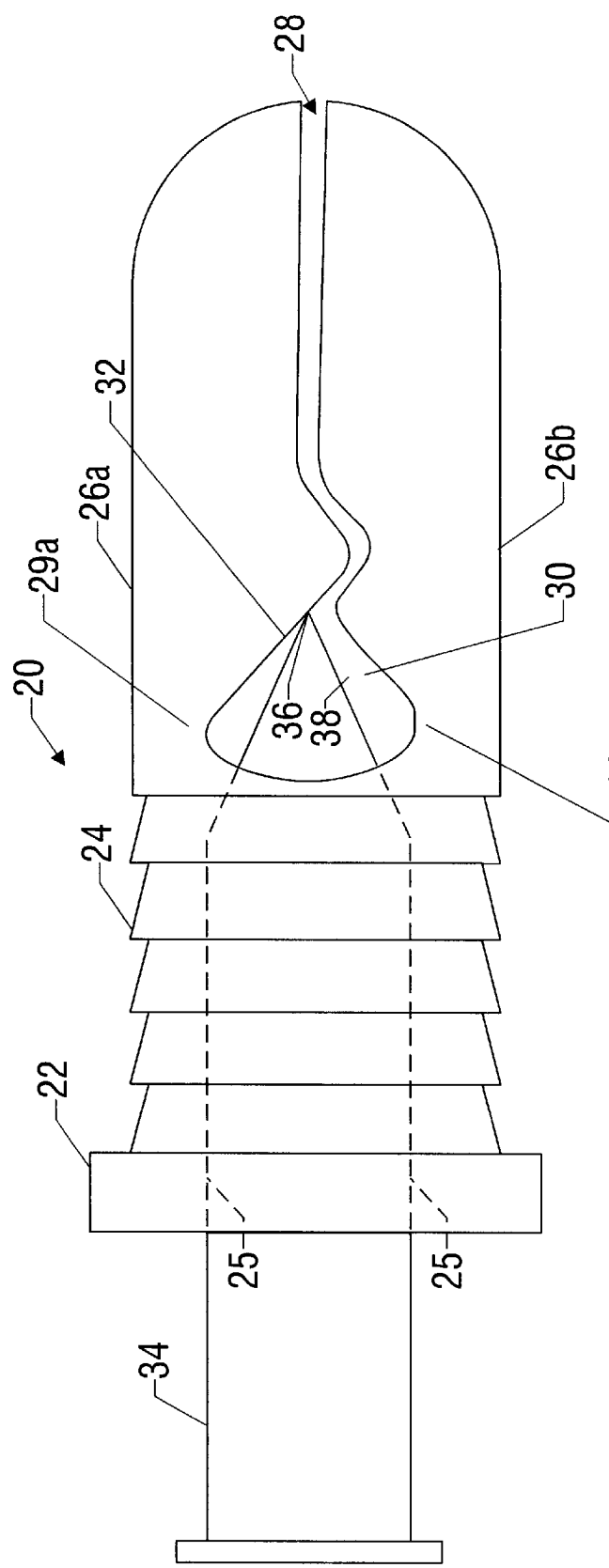
FIG. 5 is a view of one embodiment of the present invention as a securing member interacts with the ramp surfaces of the present invention.

FIG. 3 displays one embodiment of the novel wall anchor 20 of the present invention. Wall anchor 20 of the illustrated embodiment of the present invention includes a head 22 preferably having a bore 23 therethrough (shown in FIG. 4) for receiving a securing member (not shown) such as a bolt, pin, screw, nail or similar object. The bore can be of any acceptable shape to receive a securing member, but is preferably at least partially circular. In one example, the bore can have a flattened portion so as to better secure the securing member, as described in U.S. Pat. No. 5,553,851. The head can also be of any configuration, including having a hook or other member integrally formed or attached thereto in order to hang an item (for example a wire shelf) to a wall.

Wall anchor 20 also contains a barrel 24 having a bore therethrough (shown with the bore defined by dashed lines 25) and a plurality of preferably resilient fingers, here shown in a preferred embodiment of two asymmetrical fingers 26a and 26b. The barrel 24 is attached at one end to the head 22, and the fingers are flexibly joined to the barrel 24 at the barrel's other end. The diameter of the bore through barrel 24 is preferably substantially the same size as the bore in the circular head 22. The barrel 24 is also preferably notched, as shown, so that the notches can cut into or otherwise engage the wall material when the wall anchor 20 is being pulled from the wall, so as to prevent slippage.

Channel 28 separates the asymmetrical fingers 26a and 26b. Unlike known wall anchors, a portion of channel 28 does not run down the centerline between the fingers. Instead, a portion of channel 28 provides ramp faces 30 and 32 that face the bore of barrel 24 and extend at least partially into the path created by the bore. This novel design allows for easier installation of a securing member in that after a securing member is passed through the bores of the head 22 and the barrel 24, it contacts the ramps, thereby expanding the fingers. Viewing the wall anchor from the front and looking through the bore 25, as in FIG. 4, it can be seen how ramp faces 30 and 32 extend into the path created by the bore 25. Channel 28 is not visible between the fingers 26a and 26b, because in combination the ramp faces 30 and 32 on the two fingers cover the path created by the bore 25.

In the embodiment shown in FIG. 5, the securing member first contacts one ramp and begins expanding its respective finger, and then contacts the other ramp, expanding its respective finger. By beginning the expansion of one finger at a time in the preferred embodiment, the securing member is made easier to push or screw into the wall anchor 20. Furthermore, the ramps are preferably made out of a deformable material, such as plastic, such that after being engaged by the securing member, the ramps 30 and 32 on fingers 26b and 26a respectively, can deform and flatten out, ending up in continuous contact with the shaft of the securing member.

Figure 6:
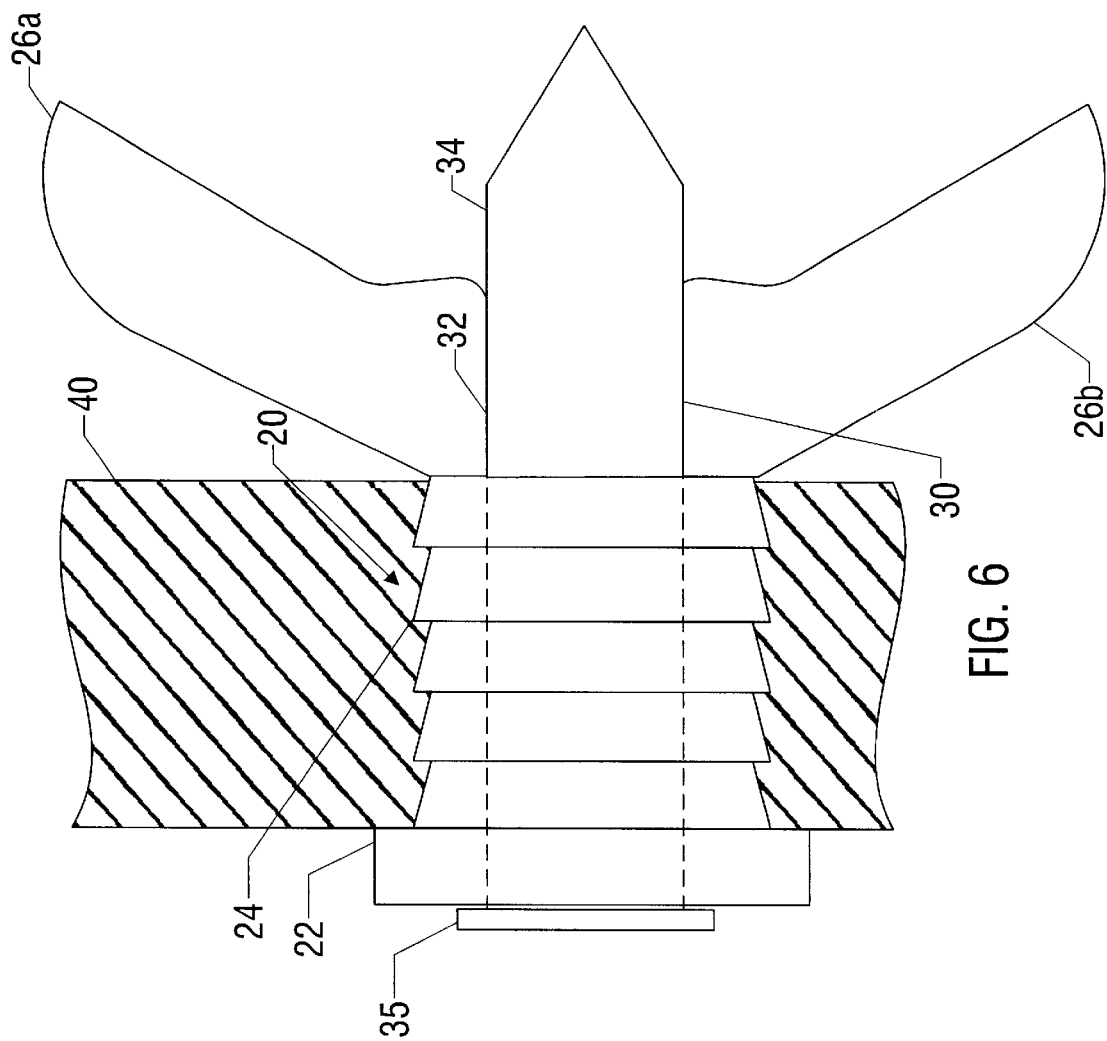
FIG. 6 is a view of one embodiment of the present invention with its fingers expanded.

The extent of such deformation will likely depend on the thickness of the wall or other support to which it is attached. If the fingers are completely free from the wall (as shown in FIG. 6) less deformation will take place than if all or a portion of the fingers was positioned inside of the thickness of the wall. This deformation of the ramps redistributes some of the stress loading on the anchor from the hinge areas 29a and 29b where the fingers 26a and 26b connect to the barrel 14, to the ramp faces 30 and 32 that are in contact with the securing member. This helps to reduce the wall anchor's chances of breaking at the hinge area, allowing for the use of stronger, more rigid plastics, and thus increasing the strength and the life of the wall anchor.

FIG. 5 shows an example of the engagement of a securing member 34, in this case shown as a pin, with the ramp faces 30 and 32 just prior to the expansion of the fingers 26a and 26b. In the embodiment of FIG. 5, when the securing member 34 is inserted into the bore, point 36 engages flat ramp face 32. As the securing member 34 proceeds forward, finger 26a is expanded and is forced upwardly. As the securing member 34 continues forward, taper 38 will contact ramp 30, and finger 26b will expand and be forced downward. Of course, the ramps can be configured in any manner such that deformation of the ramps occurs, thereby reducing stress on the hinge portion.

FIG. 6 illustrates the securing member 34 completely inserted into an embodiment of the wall anchor 20 as shown in narrow wall 40. The securing member 35 is pushed forward until a head 35 of the securing member 34, which preferably has a larger diameter than the bore through the head 22 of the wall anchor 20, contacts head 22 of the wall anchor 20. After being expanded, the ramps 30 and 32 on fingers 26b and 26a, respectively, deform (slightly, in the embodiment shown), ending up in continuous contact with the shaft of the securing member 34. Expanded fingers 26a and 26b thus secure the wall anchor 20 to the wall 40. As discussed above, wall anchor 20 can also be similarly mounted in walls that are thicker than the barrel 24. The ramps 30 and 32 of FIG. 6, however, would be more deformed by the securing member 34 and could even 'flatten' to the sides of the fingers, thus creating a securing force on the inside of the wall 40.

The wall anchors of the present invention are preferably of unitary construction and made of a suitable resilient plastic or polymer material, such as polypropylene. ABS is the most preferred plastic material of construction. ABS is stronger, stiffer and tougher than high impact polystyrene and is also superior to it in its resistance to high temperatures and chemicals. This stronger, stiffer, tougher nature of ABS makes it desirable to improve the strength characteristics of the wall anchor. Stiffer plastics can have tendency to break when under stress, particularly in colder climates. The novel design of the present invention, however, redistributes the stresses away from the hinge areas where the fingers connect to the barrel. Thus, harder, stiffer ABS can be used without the worry that the wall anchor will break at the hinge area.

The use of harder, stiffer plastics also allows the wall anchor to be designed so as to screw itself into a wall or other support structure. Commonly, a hole is first drilled into the support structure of relatively the same or slightly smaller diameter of the barrel of the wall anchor. The wall anchor is inserted therein, and then the securing member inserted into the wall anchor to secure it to the support structure. In contrast, in one embodiment of the present invention the wall anchor can be designed with a self drilling point to cut its own hole.

Figure 7:
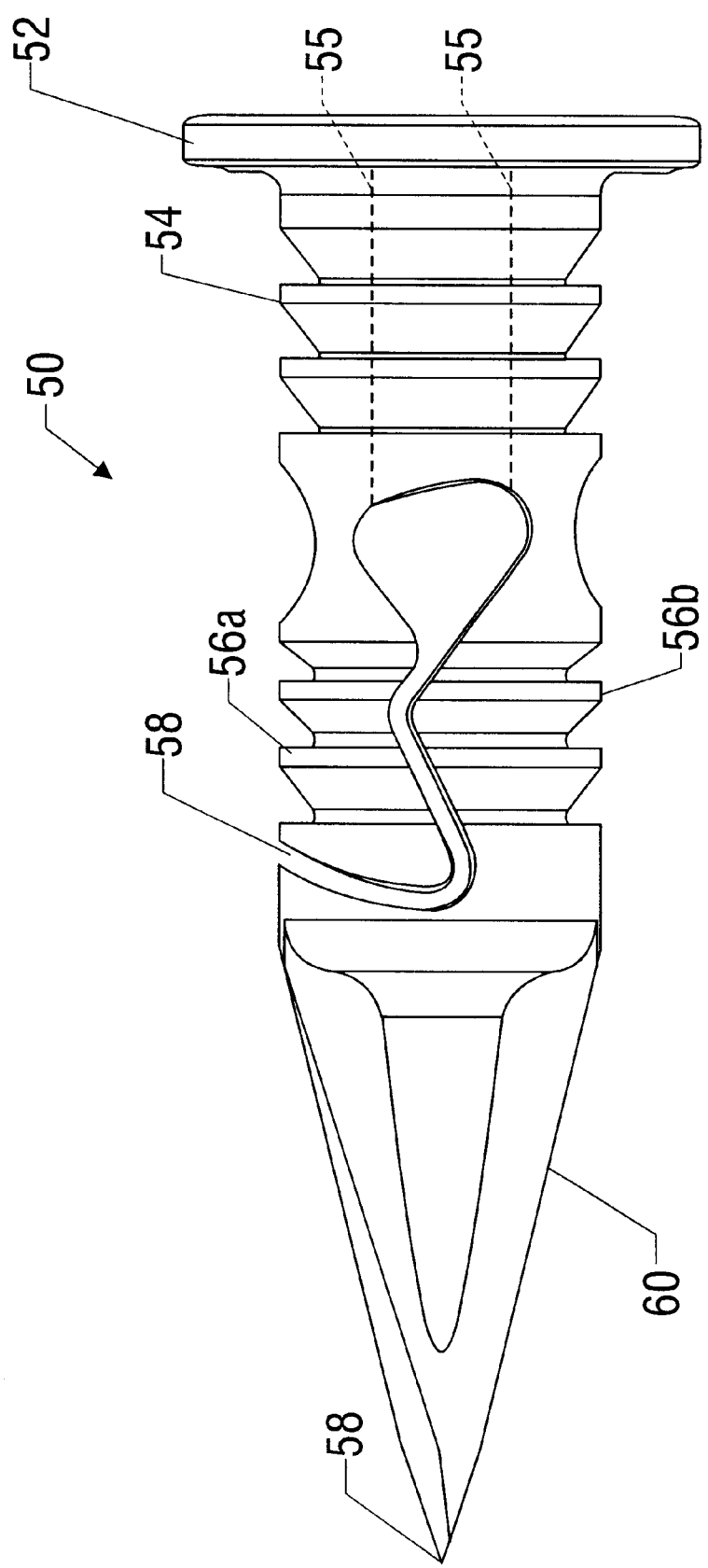
FIG. 7 is a side view of an embodiment of the present invention having a self-drilling feature.

Referring now to FIG. 7, another embodiment of the current invention, wall anchor 50, is shown with head 52 and barrel 54, each having bore therethrough (shown by dashed lines 55) for receiving a securing member (not shown). Wall anchor 50 also contains a plurality (preferably a pair) of fingers 56a and 56b flexibly joined to the barrel 54. The diameter of the bore through barrel 54 is substantially the same size as the bore in the head 52.

Channel 58 separates fingers 56a and 56b much like the embodiment of the wall anchor shown in FIG. 3. In this embodiment, though, the channel divides the fingers 56a and 56b so that one finger, finger 56b as shown, can have a screw tip 60 attached to it. Screw tip 60 has a self-drilling point 58 that cuts its own hole in the wall or support member. Head 52 of wall anchor 50 may have a means for receiving a screwdriver therein for screwing the self-drilling wall anchor 50 into a wall or support member. For example, head 52 can have slots therein for insertion of the tip of a screwdriver. Wall anchor 50 can also be configured to be driven into a wall with a hammer, mallet or similar device.

The wall anchors of the present invention are preferably manufactured as a single piece with all the features incorporated therein. The wall anchor of the present invention can also be attached to or manufactured as a single piece with a functional unit of some sort. For instance, U.S. Pat. No. 4,735,325 discloses a support clip requiring a means for attachment to a support structure. The wall anchor of the present invention can be used as those means, and could be made in unitary construction with the support clip. Generally, functional units in need of a wall anchor of the present invention will be hooks, clips, rings, support structures such as shelving, and other apparatuses that are attached to a wall or other support structure.

While the structures of the present invention have been described in terms of preferred embodiments, it will be apparent to those of skill in the art that variations may be applied to what has been described herein without departing from the concept and scope of the invention. All such similar substitutes and modifications apparent to those skilled in the art are deemed to be within the scope and concept of the invention as it is set out in the following claims.

What is claimed is:

1. A wall anchor comprising:

a barrel having a bore extending longitudinally therethrough and a plurality of fingers, at least 2 of which are asymmetrical, said fingers attached to the barrel;

wherein a non-linear channel separates the fingers, the channel defining resiliently-deformable ramp surfaces on the fingers, each ramp surface facing the bore of the barrel and at least partially extending into the path created by said bore;

wherein when a securing member is inserted into the bore, the securing member contacts the ramp faces so as to provide spreading force to the fingers, after which the ramp faces remain in contact with the securing member; and wherein at least one finger further comprises a self-drilling portion so that the wall anchor can be inserted into a wall or support member without pre-drilling a hole into said wall or support member.

2. The wall anchor of claim 1 wherein the self-drilling portion of the one finger comprises a screw tip.

3. The wall anchor of claim 1 further comprising a head having a bore extending longitudinally therethrough that is aligned with the bore of the barrel.

4. The wall anchor of claim 3 wherein the head comprises a means for engaging a screwdriver.

5. The wall anchor of claim 1 further comprising a securing member able to be inserted into the bore.

6. The wall anchor of claim 1 wherein the barrel is notched.

7. The wall anchor of claim 1 wherein the internal bore is at least partially circular in cross-section.

8. The wall anchor of claim 1 wherein the wall anchor is of unitary construction.

9. The wall anchor of claim 1 wherein the wall anchor is made of a resilient plastic material.

10. The wall anchor of claim 9 wherein the wall anchor is made of ABS plastic.

11. The wall anchor of claim 7 wherein the bore has a flattened portion on one side.

* * * * *